Feb. 20, 1923.
S. W. BOURN.
MACHINE FOR CUTTING SHEET RUBBER.
FILED JUNE 16, 1921.
1,445,990.
2 SHEETS—SHEET 2.
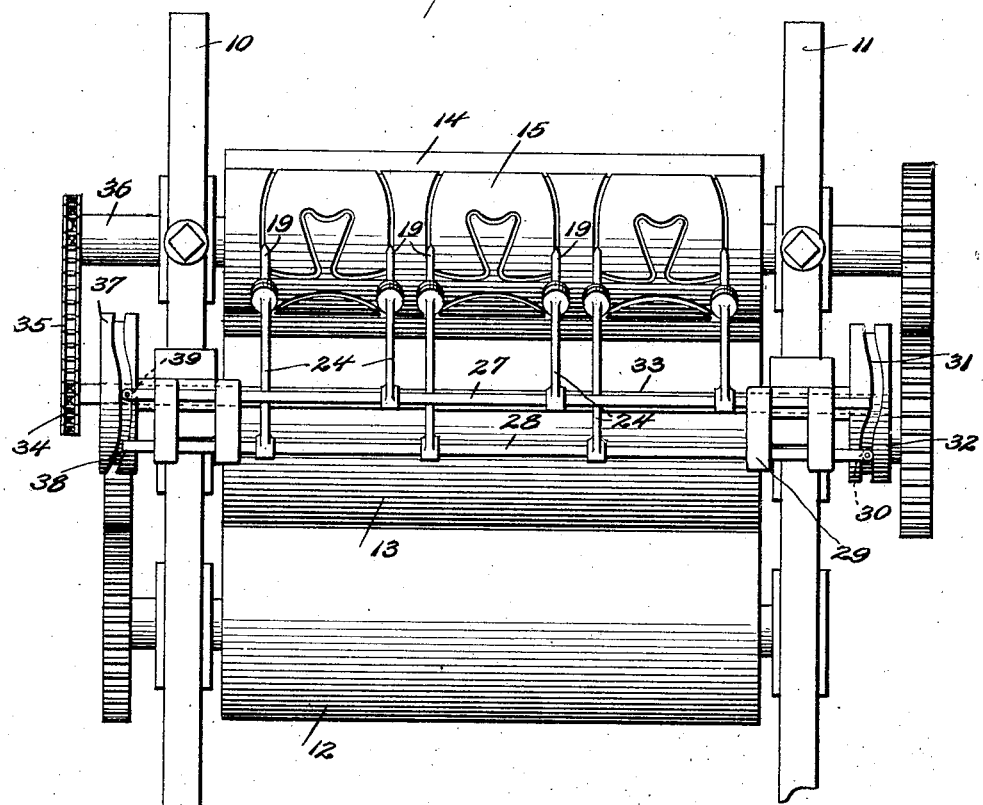
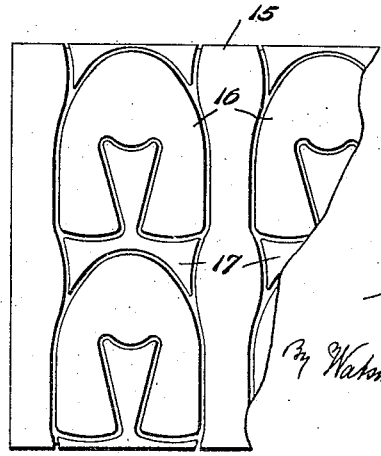

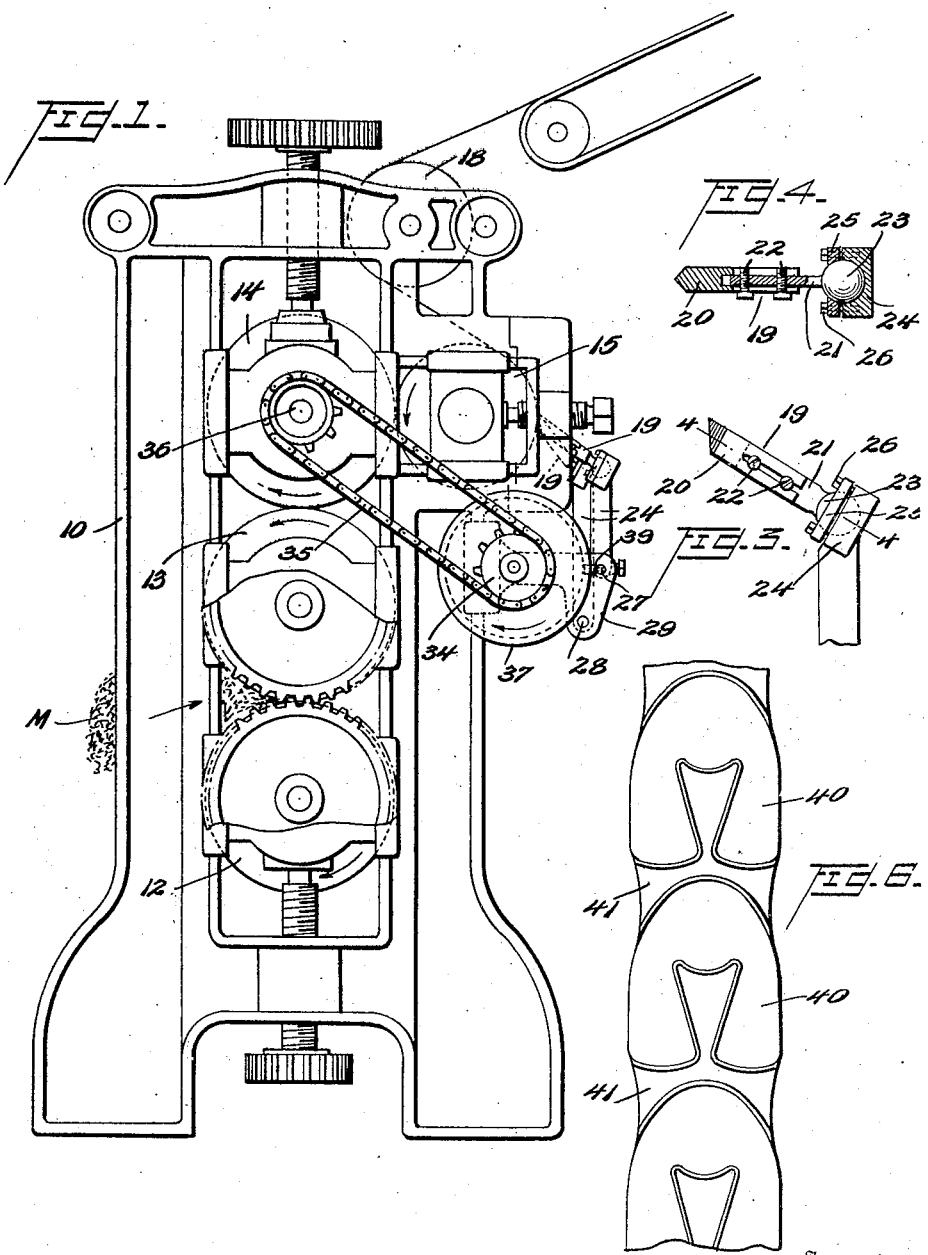

Patented Feb. 20, 1923.

1,445,990

UNITED STATES PATENT OFFICE.

STEPHEN W. BOURN, OF BRISTOL, RHODE ISLAND.

MACHINE FOR CUTTING SHEET RUBBER.

Application filed June 16, 1921. Serial No. 478,121.

*To all whom it may concern:*

Be it known that I, STEPHEN W. BOURN, a citizen of the United States, and residing at Bristol, Bristol County, State of Rhode Island, have invented certain new and useful Improvements in Machines for Cutting Sheet Rubber, of which the following is a specification.

The present invention relates to machines for fabricating rubber articles and particularly to machines adapted to receive rubber in a heated and plastic state and to form it into a continuous sheet by a rolling process, and from which sheet the articles are cut.

The object of the invention is to provide a machine of this type for cutting the sheet of rubber formed into longitudinal strips while such sheet is still in its heated and plastic state, these strips comprising rows of blanks and having symmetrically curved edges which in part form the edges of the finished article. Each strip comprises a series of such blanks connected by strips or webs of waste material, which must be cut away by hand. The machine is particularly useful in fabricating rubber shoes especially the uppers of such shoes, which have heretofore been cut from sheet rubber entirely by hand. By means of the present invention long chains of these uppers partially cut out are furnished by the machine, and it is only necessary for the hand operators to sever the individual blanks from each other, and to trim them somewhat in the finishing operation. The cutting of such strips is done by the machine while the rubber is in a soft and plastic state and before it has had time to shrink.

One form of the invention is illustrated by way of example in the accompanying drawings in which:

Fig. 1 is an end elevation of the improved machine;

Fig. 2 is a side elevation of portion of the same showing the cutting knives;

Fig. 3 is a side view of one of the cutting knives;

Fig. 4 is a section on line 4—4 of Figure 3;

Fig. 5 is a developed view of one of the rolls of the machine; and

Fig. 6 is a plan view of portion of one of the strips formed by the apparatus.

The frame of the machine comprises essentially parallel upright side members 10 and 11 held in fixed spaced relation and the calendar rolls 12, 13 and 14 are rotatably supported in these side members and geared together for simultaneous rotation. These rolls are provided with means to maintain them in heated condition, and are relatively adjustable so that the distance between their rolling surfaces may be varied in forming sheets of different thicknesses. The structure so far disclosed is well known in the art.

Journalled in the frame and arranged parallel to and horizontally opposite the upper roll 14 is a roll 15 which is adjustable horizontally toward and from roll 14. This roll is not positively driven but runs idly and rotates with the material passing between its surface and the surface of roll 14. The roll 15 has formed in its surface a series of grooves, as shown clearly in Figures 2 and 5. These grooves form three similar but separate belts around the roll, the belts being symmetrical but of varying widths, as shown in Figure 5, and there being transverse grooves so that each belt is divided into a series of figures, the alternate figures being similar and equal in size. In Figure 5 the two U-shaped sections 16 of the belt are in the form of the developed upper portion of a rubber shoe and the portions 17 of the belt lying intermediate these U-shape portions are merely spacing portions which are later cut away.

In the operation of the machine as it is so far described, a mass M of rubber is fed, in the direction of the arrow, between rolls 12 and 13 to form a sheet, and this sheet passes around roll 13 and is further pressed and reduced in thickness between rolls 13 and 14. After going around roll 14 the sheet passes between rolls 14 and 15 where patterns are formed in the rubber by the face roll 15, the plastic rubber flowing into the grooves formed in the surface of roll 15. The sheet then passes around roll 15 and over the idler roll 18 from where it may be conveyed to any desired point.

As the sheet of rubber passes around the roll 15 and while it is still in a heated and plastic state, it is cut into strips by a series of knives 19. One of these knives is clearly illustrated in Figures 3 and 4 and comprises a forward portion 20 having a cutting edge and a rear portion 21 which has a tongue extending into a slot in the forward portion, set screws 22 passing through portion 21 and engaging the margins of a second slot in member 19, so that the two portions are adjustably secured together. Portion 21 has a spherical end which rests in a spherical seat in the upper portion of a support 24, a plate 25 bearing on the outer surface of ball 23 and being adjustably secured to member 24 by screws 26 so that by manipulating these screws, the plate may be loosened and the knife turned in its socket to any desired angle.

There are six of these knives 19 and three of them are supported on a horizontal bar 27 and three of them on a second horizontal bar 28, parallel to bar 27 and immediately below it. These bars are slidably mounted in brackets 29 extending forwardly from the frame so that they may be moved transversely of the machine to change the positions of the knives. Bar 28 has at one end an inwardly extending lug 30 which extends within a cam groove 31 in a rotatable disk 32 fixed on a shaft 33 journalled in the frame of the machine.

Shaft 33 has at its opposite end a sprocket 34 connected by a chain 35 to the shaft 36 of the upper calendar roll so that shaft 33 is rotated simultaneously with shaft 36. Mounted on shaft 33 between sprocket 34 and the side frame member 10 is a second disk member 37 which is provided with a cam groove 38. Bar 27 has an inwardly extending lug 39 which engages this groove. Grooves 38 and 31 are similarly but oppositely formed so that as rod 27 is moved in one direction by its cam, rod 28 will be moved through the same distance in the opposite direction. The cams are so formed that the knives are constrained to move in the substantially circumferential grooves of the face roller and to cut the soft plastic rubber along the lines of the patterns formed therein by this roll.

The strips, whether partially or completely severed from each other, pass together over roll 18 to a point where they may be separated, and each strip is then operated on by hand to separate the formed uppers 40 from the waste or web portions 41. A great saving of hand labor is effected by the machine in forming the strips. The opposite edges of the portions 40 are accurately cut and it only remains for the hand operator to separate these portions and trim the ends, an operation which may be much more quickly performed than when necessary to cut the whole form from a solid sheet.

Instead of forming three strips from a sheet, as shown, either one or any desired number of strips may be formed, depending upon the size of the machine, and it will be obvious to one skilled in the art that the design and arrangement of parts of the machine may be otherwise altered without departing from the scope of the invention.

Having thus described the invention what is claimed as new and desired to be secured by Letters Patent is:

1. In a machine of the class described, in combination, a rotatable roll over which rubber in a sheet is adapted to pass, a knife cooperating with the roll to make a continuous impression in the sheet, and means for automatically moving said knife longitudinally of the roll, for the purpose set forth.

2. A machine of the class described, including in combination, means for moving a strip of sheet material in the direction of its length, two knives for making continuous impressions in the moving strip and a separate cam member for each of said knives whereby they are moved laterally simultaneously to cut a strip having curved edges symmetrical with respect to its longitudinal axis.

3. A machine of the class described, including in combination, means for moving a strip of sheet material in the direction of its length, two knives for making continuous cuts in the moving strip, and means associated with each of said knives whereby it is automatically moved laterally to make a curved cut in the moving strip.

4. In a machine of the class described, in combination, a rotatable roll over which rubber in a sheet is adapted to pass, a knife for making a continuous cut in the sheet, and means operating in synchronism with the roll for laterally moving the knife, for the purpose set forth.

5. In a machine of the class described, in combination, a rotatable roll over which rubber in a sheet is adapted to pass, a knfie for making a continuous cut in the sheet, and a cam member operatively connected to the roll for laterally moving the knife, for the purpose set forth.

6. In a machine of the class described, in combination, a rotatable roll over which rubber in sheet form and plastic condition is adapted to be passed, said roll having a curved circumferential groove therein, a knife cooperating with the roll in making a continuous cut in the sheet, and cam means for moving the knife laterally to cut the sheet along the rib formed by the roll.

In testimony whereof I hereunto affix my signature.

STEPHEN W. BOURN.